(12) United States Patent
Chigurupati

(10) Patent No.: US 7,062,677 B1
(45) Date of Patent: Jun. 13, 2006

(54) METHOD FOR CAPTURING CORE DUMP OF A SERVICE MODULE

(76) Inventor: Chakravarthi Chigurupati, 2175 Decoto Rd. #84, Union City, CA (US) 94587

( * ) Notice: Subject to any disclaimer, the term of this patent is extended or adjusted under 35 U.S.C. 154(b) by 714 days.

(21) Appl. No.: 09/928,176

(22) Filed: Aug. 9, 2001

(51) Int. Cl.
*G06F 11/00* (2006.01)

(52) U.S. Cl. ............... 714/25; 714/27; 714/45; 714/2; 707/206; 713/2

(58) Field of Classification Search ............ 713/2; 714/23, 45, 25, 36, 27, 2
See application file for complete search history.

(56) References Cited

U.S. PATENT DOCUMENTS

| | | | | |
|---|---|---|---|---|
| 5,339,406 A * | 8/1994 | Carney et al. | ............ | 714/45 |
| 6,098,158 A * | 8/2000 | Lay et al. | ............ | 711/162 |
| 6,202,090 B1 * | 3/2001 | Simone | ............ | 709/220 |
| 6,216,225 B1 * | 4/2001 | Yoo | ............ | 713/2 |
| 6,279,120 B1 * | 8/2001 | Lautenbach-Lampe et al. | .. | 714/15 |
| 6,430,707 B1 * | 8/2002 | Matthews et al. | ............ | 714/37 |
| 6,434,696 B1 * | 8/2002 | Kang | ............ | 713/2 |
| 6,681,348 B1 * | 1/2004 | Vachon | ............ | 714/45 |
| 6,732,265 B1 * | 5/2004 | Esfahani et al. | ............ | 713/2 |
| 6,775,698 B1 * | 8/2004 | Simone | ............ | 709/221 |
| 2002/0099971 A1 * | 7/2002 | Merkin et al. | ............ | 714/6 |
| 2004/0205399 A1 * | 10/2004 | Wang et al. | ............ | 714/25 |
| 2004/0221147 A1 * | 11/2004 | Tseng et al. | ............ | 713/1 |
| 2005/0223209 A1 * | 10/2005 | Chang | ............ | 713/2 |

* cited by examiner

*Primary Examiner*—Robert Beausoliel
*Assistant Examiner*—Christopher McCarthy
(74) *Attorney, Agent, or Firm*—Blakely, Sokoloff, Taylor & Zafman LLP

(57) ABSTRACT

A bootstrap program is loaded into an area of memory previously occupied by a run time program in a service module. The bootstrap program is loaded after the service module is reset due to an error. The service module does not have a persistent storage. The bootstrap program captures a memory image of the memory. The captured memory image of the memory is compressed and transferred to a control module to be stored in a persistent storage of the control module. The control module receives captured memory images from one or more service modules.

25 Claims, 5 Drawing Sheets

METHOD FOR CAPTURING CORE DUMP OF A SERVICE MODULE

FIELD OF THE INVENTION

The present invention relates generally to field of communication system, more specifically directed to capturing core dump for hardware and/or software debug.

BACKGROUND

Product testing ideally will capture all hardware and/or software errors so that they can be corrected prior to product release. However, certain errors such as, for example, memory corruption, memory leaks, resource leaks, etc. are difficult to catch during product testing. Other types of errors may manifest only after prolonged use. When such errors occur, it is imperative to capture the memory image so that debugging can be performed. The act of capturing the memory image is called core dump (i.e. a dump of the memory core). A captured memory image may be examined using standard debugging tools.

In communication equipments with distributed processing ability, there may be multiple service modules. These service modules exist with their own processors and memory. One of these service modules normally controls the equipment and is called a control module. For example, the MGX 8850 switch manufactured by Cisco Systems of San Jose, Calif., can hold up to 12 ATM Switching Modules (AXSM) and two Processor Switching Modules (PXM) on multiple shelves. The Processor Switching Module (PXM) is referred to as a core card, core node or control module. Within a shelf, there is one control module and several service modules. Each module generally comes in a card set which consists of a front card (with its attached daughter card) and one or two back cards (or line modules). The front card contains the processing intelligence and, on the daughter card, the firmware that distinguishes the interface (e.g., OC-48, OC-3, T3, E3, and so on). The service modules interact with each other using a shared bus (e.g., cell bus). Typically, only the control module has a persistent storage (e.g., hard disk).

In normal operation, the service module is controlled by execution of a run time program. The run time program may be a communication program that is loaded or mapped into an area of the memory of the service module. The run time program may use another area of the memory as a data area. Typically, when an error occurs in the service module, an error code is written into an error log in a reserved memory area and the service module is reset. The error log is later examined to determine the cause of the error. Resetting the service module may mean reloading the same run time program into the memory and overwriting the data area with new data, thus making the previous data unavailable for debugging or error analysis. Current error analysis depends on the value of the error code written into the reserved memory.

From the above, it can be seen that there is a need for a technique for capturing the memory image of the service module when an error occurs prior to overwriting the data area of the memory with new data.

SUMMARY OF THE INVENTION

A bootstrap program is loaded into an area of memory previously occupied by a run time program in a service module. The bootstrap program is loaded after the service module is reset due to an error. The service module does not have a persistent storage. The bootstrap program captures an image of the memory. The captured image of the memory is compressed on-the-fly and transferred to a control module to be stored in a persistent storage of the control module. During the transfer process, the regular operation of the control module is not affected.

Other features of the present invention will be apparent from the accompanying drawings and from the detailed description which follows.

BRIEF DESCRIPTION OF THE DRAWINGS

The present invention is illustrated by way of example, and not limitation, in the figures of the accompanying drawings in which.

DETAILED DESCRIPTION

In one embodiment, a method and a system for capturing a memory image of a service module having no persistent storage is disclosed. A bootstrap program is loaded into a memory area that was used by a runtime program when an error occurs in the service module. The bootstrap program captures the memory image, performs compression and sends the compressed data to a control module using a shared bus.

In the following description, for purposes of explanation, numerous specific details are set forth in order to provide a thorough understanding of the present invention. It will be evident, however, to one skilled in the art that the present invention may be practiced without these specific details. In other instances, well-known structures, processes and devices are shown in block diagram form or are referred to in a summary manner in order to provide an explanation without undue detail.

In the following description, a boot loader is a program that is automatically executed after a service module is reset. The boot loader program may be stored in a read-only memory (ROM) and may perform a memory test of the memory of the service module when there is a power-on reset. A bootstrap program is a program that is loaded into the memory of the service module by the boot loader. The bootstrap program performs the capturing of the memory image of the memory of the service module. A run time program is a program that normally runs in the service module to perform a function associated with the service module. A cell bus is a bus shared by a control module and one or more service modules.

Figure 1:
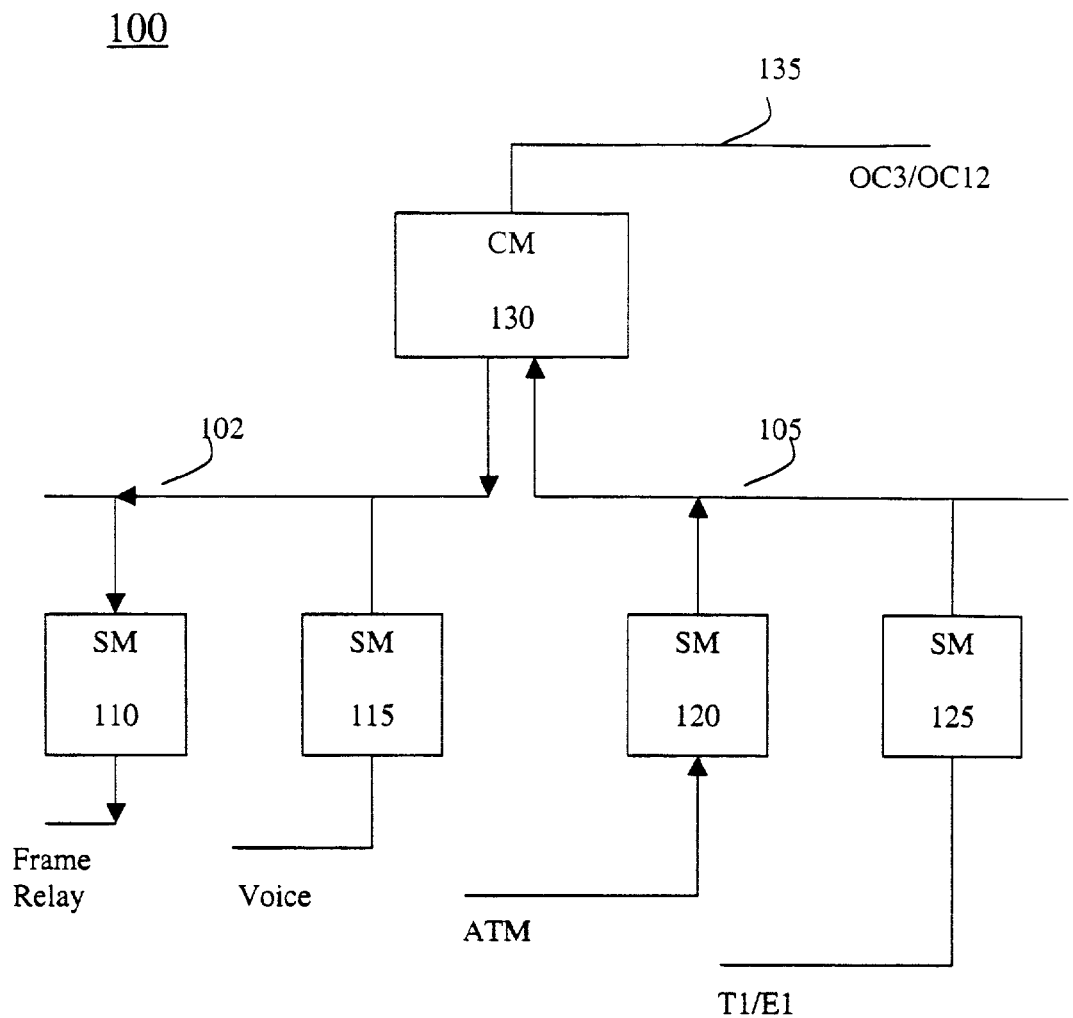
FIG. 1 is a block diagram illustrating a communication module.

FIG. 1 is a block diagram illustrating a communication module. The communication module 100 includes a control module 130 and several service modules 110–125. The control module 130 is connected with the service modules 120, 125 through a cell bus 105. The control module 130 is connected with the service modules 110, 115 through the cell bus 102. Each of the service modules 110–125 may be configured to process a type of traffic (e.g., Frame Relay, Voice, Asynchronous Transfer Mode (ATM), T1/E1, etc.). In addition to connecting with multiple cell buses (e.g., cell bus 102, 105) to the multiple service modules (e.g., service modules 110–125), the control module 130 may also be connected with a high bandwidth bus 135 (e.g., OC-12, OC-3) to a core network and other core nodes (not shown). Although FIG. 1 illustrates two cell buses 102, 105, other bus configuration may also be used (e.g., one shared bus).

When a software or hardware error occurs in a service module, the service module will reset and reboot. To investigate the failure off-line, it is extremely useful to capture an image of the memory of the service module at the time of error. Capturing the memory image of the service module is difficult due to multiple problems. For example, when a service module reboots, a small bootstrap program is loaded into the memory of the service module and executes. The bootstrap program will eventually load the runtime program. The loading and execution of the bootstrap program and the run time program may however overwrite and destroy the data area that can be used to analyze the error.

In one embodiment, utilizing the fact that the code area of the run time program is generally larger than the bootstrap program, the bootstrap program is loaded into the same area previously occupied by the run time program when the service module fails. This is because the code area of the runtime program can be overwritten without affecting the data area. This preserves the data area for failure analysis. In another embodiment, a reset reason is stored before the service module is reset. For example, the reset reason may be stored in a log buffer in a reserved area of memory. After being loaded, the bootstrap program examines the stored reset reason and determines if an image of the memory is to be captured. The bootstrap program may then capture the entire memory including the data area and the code area previously occupied by the run time program (and is now partly occupied by the boot strap program).

Figure 2:
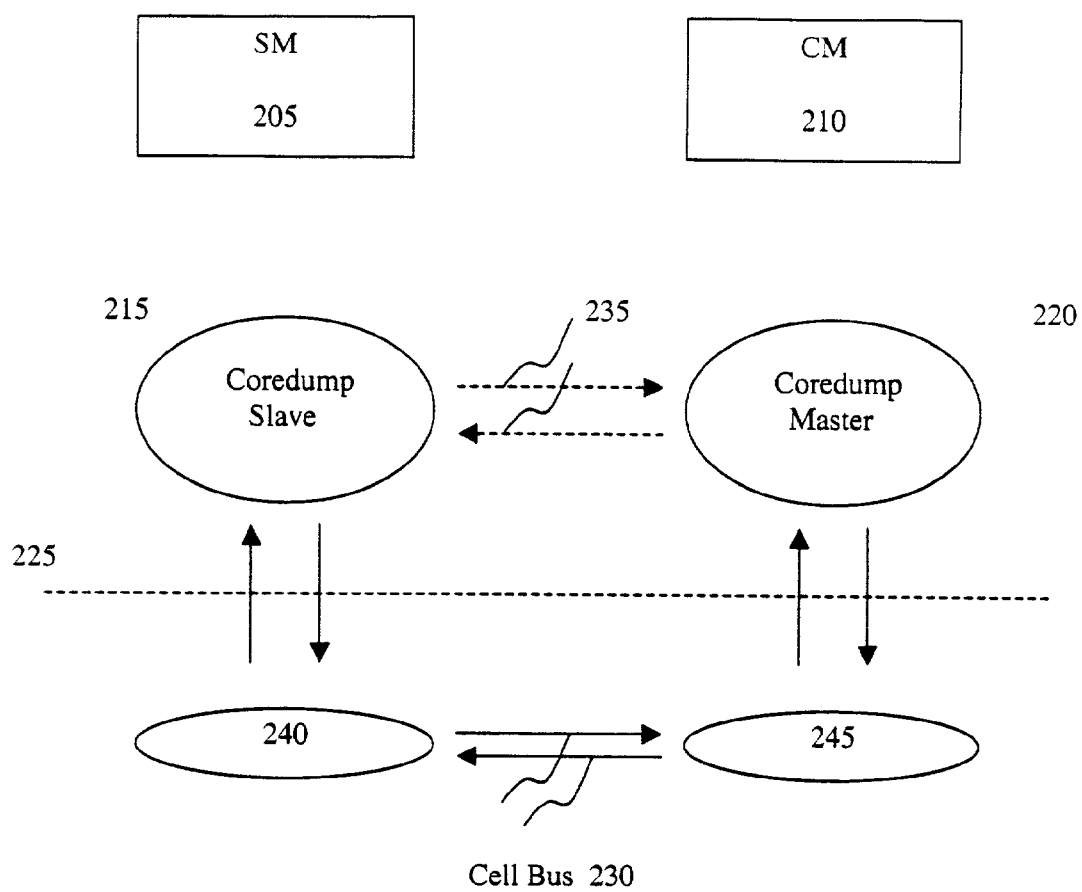
FIG. 2 is a diagram illustrating a high level architecture of the transfer of the memory image from the service module to the control module in a communication system.

FIG. 2 is a diagram illustrating a high level architecture of the transfer of the memory image from the service module to the control module in a communication system. The diagram illustrates a control module (CM) 210 and a service module (SM) 205 on a shelf. There may be other service modules on the same shelf (not shown) and any one of them can fail at any time. The control module 210 includes a core dump master task 220. The service module 205 includes a core dump slave task 215. The core dump slave task 215 is part of the bootstrap program that runs in the service module 205. In one embodiment, the core dump master task 220 is in a listening mode to receive messages from the core dump slave tasks running on the multiple service modules that are in boot stage, including the core dump slave task 215 in the service module 205.

As described above, when an error occurs in the service module 205, a reset reason is stored before resetting the service module 205. The bootstrap program then examines the reset reason to see if a core dump is required. If a core dump is required, the core dump slave task 215 sends messages to the control module 210 by way of cell bus 230 using reliable transport layers 240, 245.

The messages allow the core dump slave task 215 to transfer the memory image of the service module 205 to the core dump master task 220. The messages may be placed in a queue and processed by the control module 210, for example, in a first-in first-out order. When a message at top of the queue is an error message sent by the core dump slave task 215, the core dump master task 220 listens to additional related messages from the core dump slave task 215. These additional related messages are sent by the core dump slave task 215 in a meaningful sequence. For example, the messages may include an open-file message, a write-data-to-file message, and a close-file message, where the data comprises the core dump of the failing service module 215.

The control module 210 may receive core dumps from multiple service modules. This is because the failing service modules do not have persistent storages to store the captured memory image locally, as described above. The core dump master task 220 runs as part of a runtime code in the control module 210. For example, the core dump master task 220 may run as a low priority task. Running as a low priority task allows the core dump master task 220 not to greatly interfere with the normal operation of control module 210 (e.g., does not steal CPU cycles from other tasks in the control module 210).

In one embodiment, communication between the core dump slave task 215 and the core dump master task 220 is via a two-way protocol with the core dump master task 220 acknowledging the messages from the core dump slave task 215. For example, the core dump master task 220 may implement a proxy file for each slot in the shelf. The core dump slave task 215 may use the proxy file for the compressed core dump. Communication lines 235 illustrate a logical communication between the core dump slave task 215 and the core dump master task 220. The dotted line 225 illustrates a separation between a hardware layer (which includes the cell bus 220) and a software layer (which includes the core dump tasks 215, 220).

In one embodiment, the two-way protocol between the core dump master task 220 and the core dump slave task 215 is asynchronous. The core dump slave task 215 sends a message to the core dump master task 220 and continues with its work (e.g., compressing and preparing a next message) without having to wait for an "Acknowledgement" from the core dump master task 220. When the core dump slave task 215 is ready to send the next message, it will check to see whether it received an "Acknowledgement" for a previous message. If that acknowledgement was received, the core dump slave task 215 will send the next message. In one embodiment, if a negative "Acknowledgement" is received, the core dump slave task 215 may either ungracefully abort the core dump or gracefully bring the core dump to a conclusion. Note that during the core dump, the processor on the service module is utilized to the maximum extent because the service module is not performing any of its regular communication functions.

Figure 3:
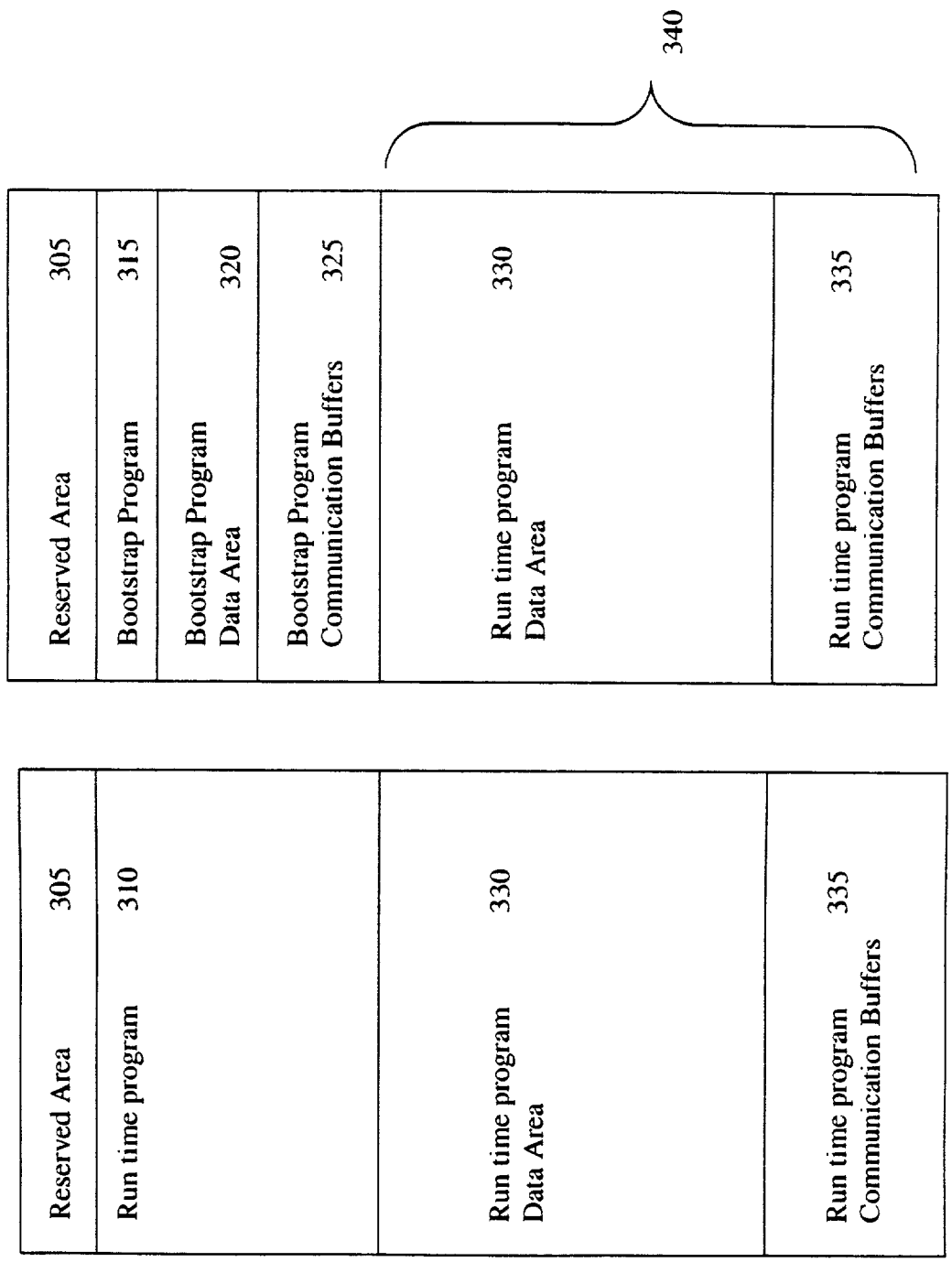
FIG. 3A illustrates a memory map 300 of the memory of the service module before an error occurs.
FIG. 3B illustrates a memory map 302 of the memory of the service module after the service module is reset and the bootstrap program is loaded.

FIG. 3A illustrates a memory map 300 of the memory of the service module before an error occurs. FIG. 3B illustrates a memory map 302 of the memory of the service module after the service module is reset. Referring to FIG. 3A, the memory map 300 illustrates a run time program memory area 310 and a data area 330 used by the run time program. Note that the data area 330 in FIG. 3A is the same as the data area in FIG. 3B. The run time program may also perform output operations using the memory area 335 for communication buffers. The reserved memory area 305 may be used to store error codes or reset reasons. Of course, the reset reasons may also be stored using other memory schemes such as, for example, registers, etc. It is preferable that the data area 330 and the communication buffers area 335 are to be kept in tact for failure analysis. These areas are illustrated as memory area 340 in FIG. 3B.

Typically, upon a power-on reset a boot loader will first gain control of the service module and performs a memory test. The memory test normally writes test patterns into the memory and thus clearing the memory of whatever was there before. Since power-on-reset is not an error condition requiring a core dump, the clearing of the memory does not pose a problem. For other reset reasons, the memory is not cleared and the memory image remains in tact. Thus the boot loader examines the reset reason to determine if a memory test is to be performed.

In one embodiment, when the reset reason is not a power-on reset, the boot loader loads the bootstrap program into the memory of the service module. Referring to FIG. 3B, the bootstrap program is loaded into a memory area 315. Memory area 320 is allocated to the data area used by the bootstrap program. Memory area 325 is allocated to any communication buffers used by the bootstrap program. Note that the memory areas 315, 320 and 325 together occupy a memory area that is previously occupied by the crashed runtime program (illustrated as memory area 310 in FIG. 3A). For example, when the memory area 310 in FIG. 3A is 3 MB, then the combined memory areas 315, 320 and 325 in FIG. 3B will not damage the data area 330 as long as the size of the combined memory areas is less than or equal to 3 MB.

The amount of memory area occupied by the run time program may vary from one service module to another service module. For example, one run time program may occupy 5 MB while another run time program may occupy only 3 MB. In one embodiment, it is preferable that the combined memory areas 315, 320 and 325 is less than or equal to a smallest size run time program. This will ensure that the bootstrap program can be used for any service module on a shelf without damaging the corresponding data area.

The control module may include other tasks performing concurrently with the core dump master task described above. Thus, transferring the memory image of the service module to the control module may affect performance of the control module. In addition, transferring the memory image to the control module across the cell bus may flood the cell bus affecting performance of other service modules. In one embodiment, the memory of the service module is read block by block, compressed and then sent to the control unit in a predetermined size. For example, the bootstrap program may read the memory in blocks of size 4K each and compresses them until reaching a compress unit of 8K. The compressed unit is sent out to the cell bus. Note that each compressed output may cover a memory area of different size. For example, one compressed output may cover eight blocks (or 32K) of memory area because the data in those blocks is mostly zero. Another compress output may cover three (or 12K) of memory area. In one embodiment, the compression is done using a zip algorithm. As each compressed unit is received by the control module, it is written to a file on the persistent storage. The file can be uncompressed later for failure analysis.

Compression of the memory image reduces traffic burden on the cell bus. For example, with a service module typically having 128 MB of memory and with a compression ration of 10% to 30%, the burden of the core dump on the cell bus is drastically reduced. Reducing the burden on the cell bus reduces impact on performance of the other service modules using that cell bus. In addition, compression reduces the processing power required from the control module and thus minimizing impact on other tasks running in the control module. The control module only has to receive the compressed units and write them to the file.

Figure 4:
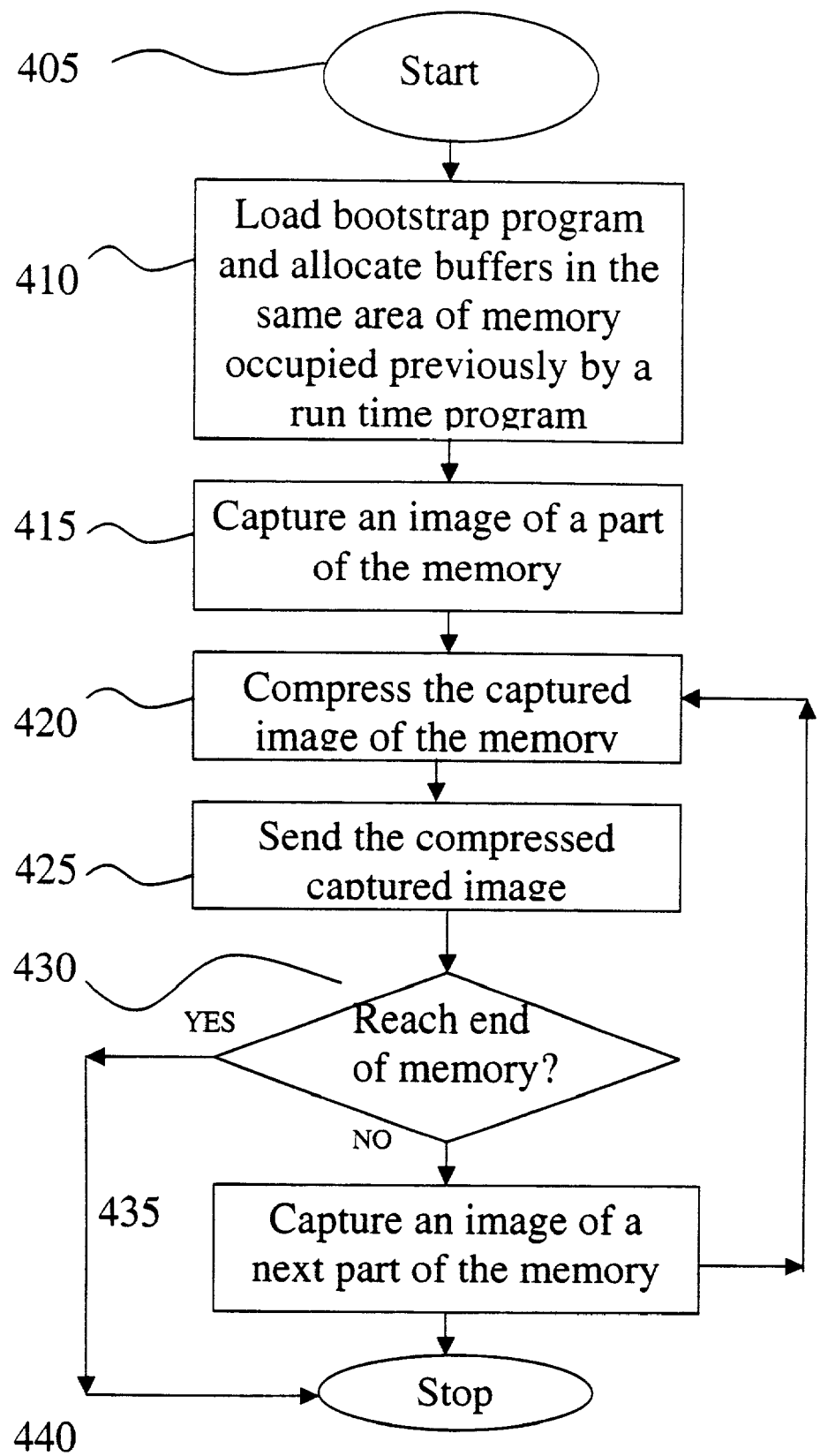
FIG. 4 is a flow diagram illustrating a process of capturing a memory image of the service module.

FIG. 4 is a flow diagram illustrating a process of capturing a memory image of the service module. The process starts at block 405. At block 410 the bootstrap program is loaded in a memory area previously occupied by a run time program when an error occurs. Communication buffers used by the bootstrap program is also allocated to this memory area. At block 415, an image of a first part of the memory is captured by the bootstrap program. At block 420, the captured image of the first part of the memory is compressed. The bootstrap program compresses the image in the service module before transferring it to the controller module. In one embodiment, the memory compression is on going, i.e., the compressed output is accumulated and transferred in blocks without waiting for the entire memory image to be compressed completely. A sliding window protocol may be used for the transfer process to achieve concurrently on both sides. At block 425, the compressed image is transferred to a control module.

At block 430, a test is made to determine if the end of the memory is reached. If it is not the end of the memory, the process moves to block 435 where an image of a next part of the memory is captured. The process then flows back to block 420 where the compression occurs as before. From block 430, if the end of the memory is reached, the process flows to block 440 where the process ends.

At the control module, the multiple compressed images represent one core dump and may then be stored in a file in a persistent storage of the control module. In one embodiment, one core dump is stored for each service module. Since a maximum number of service modules exist in a shelf is known and since size of a compressed memory image may fall in a certain range (e.g., between 5 MB to 30 MB), worst-case disk space consumption by the memory image files in the control module can be predicted.

Figure 5:
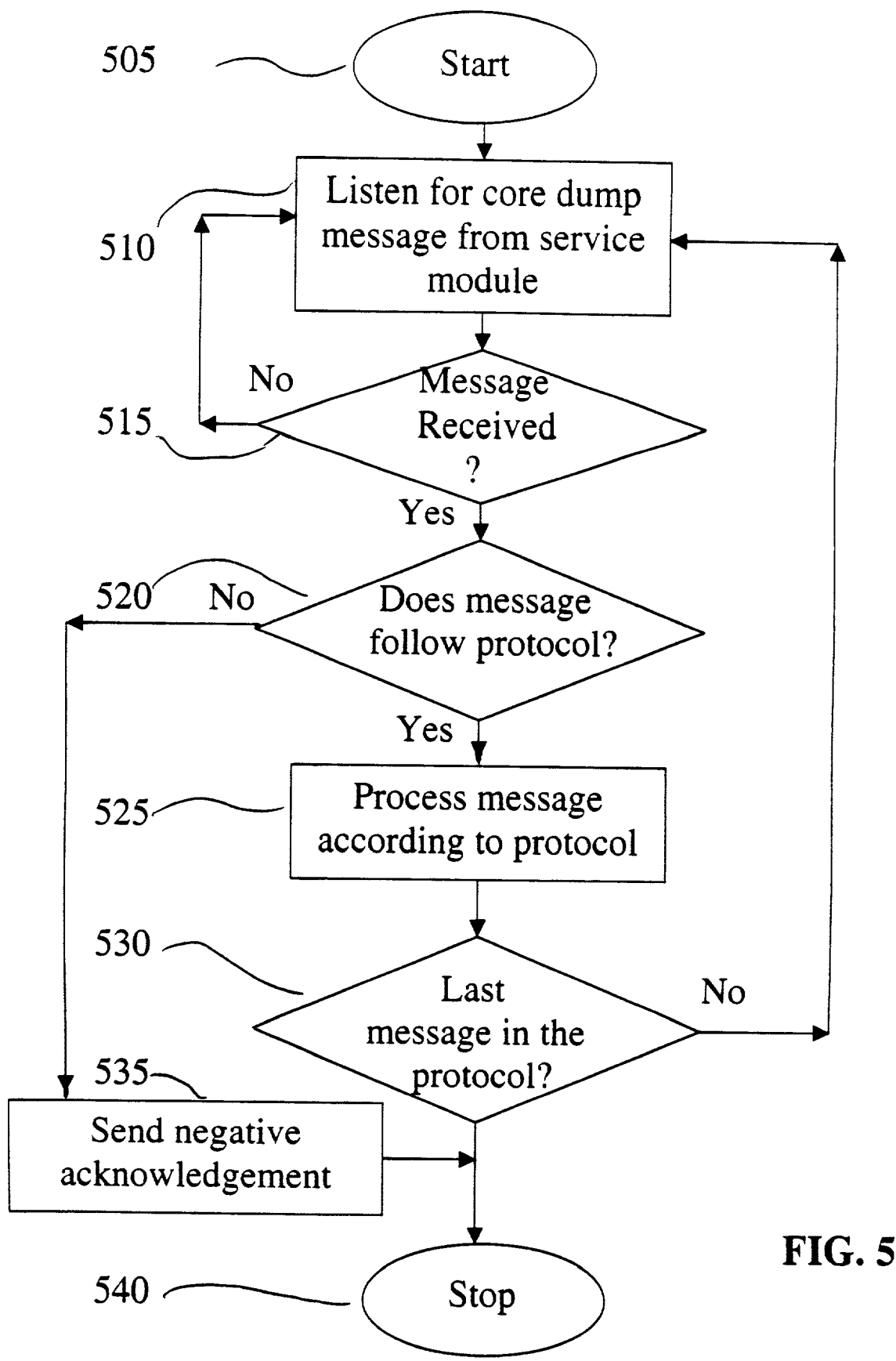
FIG. 5 is a flow diagram illustrating a process of a control module receiving a memory image of a service module.

FIG. 5 is a flow diagram illustrating a process of a control module receiving a memory image of a service module. The process starts at block 505. At blocks 510 and 515, the control module listens for core dump messages sent by a failing service module. As described above, this listening is performed by a low priority core dump master task in the control module. If no core dump message is received, the listening continues in block 510. At block 515, if a core dump message is received, the process flows to block 520. The core dump messages from the service module and the control module are sent using a protocol such that the messages from the service module follow a particular sequence, as described above. At block 520, a determination is made to see if the message just received follows the protocol (i.e., in the expected order or sequence). If the message is not in the correct sequence, the process flows to block 535 where a negative acknowledgement is sent to the service module and the process stops at block 540. From block 520, if the message follows the correct sequence, the message is processed in block 525. At block 530, a determination is made to see if the message is a last message in the protocol. The last message may be a "close file" message indicating that the entire core dump has been sent and the control module can close the core dump file in the persistent storage of the control module. If it is not the last message, the process flows back to block 510 where the control module continues to listen for additional messages. If it is the last message, the process stops at block 540.

The operations of the various methods of the present invention may be implemented by a processing unit in a digital processing system, which executes sequences of computer program instructions which are stored in a memory which may be considered to be a machine readable storage media. The memory may be random access memory, read only memory, a persistent storage memory, such as mass storage device or any combination of these devices. Execution of the sequences of instruction causes the processing unit to perform operations according to the present invention. The instructions may be loaded into memory of the computer from a storage device or from one or more other digital processing systems (e.g. a server computer system) over a network connection. The instructions may be stored concurrently in several storage devices (e.g. DRAM and a hard disk, such as virtual memory). Consequently, the execution of these instructions may be performed directly by the processing unit.

In other cases, the instructions may not be performed directly or they may not be directly executable by the processing unit. Under these circumstances, the executions may be executed by causing the processor to execute an interpreter that interprets the instructions, or by causing the processor to execute instructions which convert the received instructions to instructions which can be directly executed by the processor. In other embodiments, hard-wired circuitry may be used in place of or in combination with software instructions to implement the present invention. Thus, the present invention is not limited to any specific combination of hardware circuitry and software, nor to any particular source for the instructions executed by the computer or digital processing system.

Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A method, comprising:
   loading a bootstrap program into an area of a memory of a service module that was occupied by a run time program, the bootstrap program loaded after the service module is reset due to an error while executing the run time program;
   capturing a memory image of the memory using the bootstrap program; and
   sending the captured memory image to a control module using a bus shared by the control module and the service module, wherein the control module is configured to receive captured memory images from one or more service modules.

2. The method of claim 1, further comprising allocating communication buffers used by the bootstrap program to transfer the captured memory image to the control module, in the area of memory that is occupied by the run time program.

3. The method of claim 2, wherein the captured memory image of the memory is compressed before being sent to the control module.

4. The method of claim 3, wherein sending the captured memory image to the control module comprises sending one or more compressed units of the captured memory image to the control module without waiting for the entire memory image to be compressed.

5. The method of claim 4, wherein the one or more compressed units is stored as a file in a persistent storage of the control module.

6. The method of claim 1, wherein capturing the memory image comprises:
   reading a first block of memory; and
   compressing the first block of memory into a compressed unit before reading a second block of memory using a compression algorithm.

7. The method of claim 6, wherein one or more blocks of memory is compressed into the compressed unit until the compressed unit reaches a predetermined size.

8. The method of claim 6, wherein the compression algorithm is a zip algorithm.

9. The method of claim 1, further comprising loading the run time program into the memory of the service module after sending the captured memory image to the control module.

10. A computer readable medium having stored thereon sequences of instructions which are executable by a system, and which, when executed by the system, cause the system to:
    load a bootstrap program into an area of a memory of a service module occupied by a run time program thereby overwriting a code section, and not a data section, of the run time program, the bootstrap program loaded after the service module is reset due to an error while executing the run time program, wherein the service module does not have persistent storage capability for a core dump;
    capture a memory image of the memory using the bootstrap program; and
    send the captured memory image to a control module using a bus shared by the control module and the service module, wherein the control module is configured to receive captured memory images from one or more service modules.

11. The computer readable medium of claim 10, further comprising instructions to allocate communication buffers used by the bootstrap program, to transfer the captured memory image to the control module, in the area of memory occupied by the code section, not the data section, of the run time program.

12. The computer readable medium of claim 10, wherein the captured memory image of the memory is compressed before being sent to the control module.

13. The computer readable medium of claim 10 further comprising instructions to examine a reset reason that was stored in the system (a) before the service module is reset, and (b) when an error occurs in the service module, to see if a core dump is required.

14. The computer readable medium of claim 13, wherein one or more blocks of memory is compressed into a compressed unit until the compressed unit reaches a predetermined size.

15. The computer readable medium of claim 14, wherein the instructions to send the captured memory image to the control module comprises instructions to send one or more compressed units to the control module without waiting for the entire memory image to be compressed.

16. The computer readable medium of claim 15, wherein the one or more compressed units is stored as a file in a persistent storage of the control module.

17. The computer readable medium of claim 13, wherein the compression algorithm is a zip algorithm.

18. The computer readable medium of claim 10, further comprising instructions to load the run time program into the memory of the service module after sending the captured memory image to the control module.

19. A system, comprising:

a memory; and a processor coupled with the memory, the processor configured by a bootstrap program to capture a memory image of the memory in response to the processor being reset when an error occurs while executing a run time program, wherein the bootstrap program is loaded into an area of the memory occupied by the run time program when the error occurs.

20. The system of claim 19, wherein the captured memory image is sent out to a bus using communication buffers allocated in the area of the memory occupied by the run time program, the memory areas occupied by the bootstrap program and allocated to the communication buffers do not overlap.

21. The system of claim 20, wherein the captured memory image is sent out to the bus in compressed form.

22. A system comprising:

a memory means;

means for loading a bootstrap program into a first memory area of the memory means that is occupied by a run time program thereby overwriting a code portion, not a data portion, of the run time program, the bootstrap program loaded after a reset due to an error while executing the run time program;

means for capturing a memory image of the memory means; and means for transferring the captured memory image to a control module.

23. The system of claim 22, wherein the means for capturing the memory image comprises means for capturing an image of a second memory area used by the run time program as a data area when the error occurs.

24. The system of claim 22, wherein the means for transferring the captured memory image comprises means for compressing the captured memory image.

25. The system of claim 24, wherein the captured memory image is transferred using communication buffers allocated in the first memory area.

\* \* \* \* \*

UNITED STATES PATENT AND TRADEMARK OFFICE
CERTIFICATE OF CORRECTION

| | |
|---|---|
| PATENT NO. | : 7,062,677 B1 |
| APPLICATION NO. | : 09/928176 |
| DATED | : June 13, 2006 |
| INVENTOR(S) | : Chakravarthi Chigurupati |

It is certified that error appears in the above-identified patent and that said Letters Patent is hereby corrected as shown below:

TITLE PAGE, ITEM (73) ASSIGNEE: insert --(73) Assignee: Cisco Technology, Inc.--.

In column 6, line 14: delete "compression is on going" and insert --compression is ongoing--.

Signed and Sealed this

Twenty-sixth Day of February, 2008

JON W. DUDAS
*Director of the United States Patent and Trademark Office*